Patented Apr. 24, 1934

1,956,036

UNITED STATES PATENT OFFICE 1,956,036

DEWAXING HYDROCARBON OIL

Merton L. Langworthy, Port Arthur, Tex., assignor to The Texas Company, New York, N. Y., a corporation of Delaware No Drawing. Application July 15, 1931, Serial No. 551,053

3 Claims. (Cl. 196—19)

This invention relates to treating hydrocarbon oil, and more particularly to an improved process of separating solid hydrocarbon constituents, such as paraffin wax, from mineral oils for the production of oils of desired lubricating characteristics.

The invention broadly contemplates the process of treating wax-bearing petroleum oil for the removal of its wax constituents and the production of low pour test lubricating oil comprising mixing with the wax-bearing oil a wax precipitating liquid medium which is completely miscible with and has a solvent action on the liquid hydrocarbon constituents but substantially no solvent action on the wax constituents at the temperatures at which they are precipitated from the solution as solid hydrocarbons, chilling the mixture of wax-containing oil and solvent liquid to effect precipitation of the solid hydrocarbons, then mixing finely divided granular filter-aid material with the mixture of liquid and precipitated wax while chilled, and filtering the resulting admixture to separate the solid hydrocarbons and granular material.

More specifically, the invention contemplates preparing a wax-containing lubricating oil fraction from crude petroleum by distillation at subatmospheric pressures and mixing with the oil solvent liquids of the type such as acetone, methyl ethyl ketone, propylene dichloride and benzol. The selective solvent liquid or wax precipitating liquid medium may comprise a mixture of the foregoing solvents, such as, for example, mixtures of acetone and benzol, or it may comprise some of the above materials individually, or other organic materials, such as diethylene-glycol-monobutyl ether possessing solvent properties for the liquid hydrocarbons, with less solvent action upon paraffin wax than petroleum naphtha, and which solvent or solvent mixtures are adapted to form mixtures with the wax-containing oil from which, when cooled, the wax constituents or solid hydrocarbons are precipitated and such that upon removal of these precipitated solid hydrocarbons by filtration the filtered oil has a pour test substantially the same as the temperature at which the filtering step is carried out. The mixture of the wax-containing oil and solvent liquid in suitable proportions is chilled to a temperature of 0° F. or below in order to effect precipitation of the wax constituents, following which a finely divided granular filter-aid material, such as diatomaceous earth or fuller's earth, is commingled with the chilled oil, solvent and precipitated wax. The resulting mixture, while maintained in a chilled condition, may be filtered advantageously under pressure in a filter of the rotating leaf type to separate from the oil and solvent the solid wax constituents and finely divided granular material in the form of a filter cake which is comparatively leans in retained liquid hydrocarbons and thus produce a maximum yield of lubricating oil having a pour test substantially the same as, or preferably not more than 10° F. higher than, the filtering temperature of the mixture.

It is old in the prior art to employ petroleum fractions, such as naphtha, as a diluent for mixing with wax-containing oils for the purpose of facilitating the removal of the wax constituents. It has been necessary, when employing naphtha or other petroleum fractions as the diluent, to employ exceedingly low chilling and filtering temperatures in order to obtain a final lubricating oil product of the desired pour test. Thus, in order to prepare oils having a pour test of 10° F., for example, it has been necessary to chill the oil and naphtha mixture to temperatures of —30° F., or even lower, and maintain the mixture at substantially this temperature during the entire filtering operation. The necessity for maintaining such large dewaxing temperature differentials is largely due to the solvent action of naphtha or other light petroleum fractions upon the wax constituents even at relatively low temperatures.

It has been attempted to improve this type of dewaxing operation by adding to the solution to be dewaxed prior to cooling a wax adherent or gathering material such as fuller's earth upon which the wax constituents have been precipitated from the oil upon cooling, and the resulting mixture of liquid and suspended solid material has been subjected to filtration in the usual manner. However, in this method of operation, wherein the solid material has been mixed with the oil prior to the chilling, very considerable difficulty has been encountered in filtering out the resulting solid material which has tended to form a slimy mass which has rapidly clogged the filtering surfaces. This is due to the fact that the wax, when precipitated from the oil, adheres to the particles of granular material forming a coating of wax thereover, which interferes with the effective use of the particles of granular material as a filter-aid medium.

With a demand for lubricating oils of relatively low pour test, methods of wax removal have also been developed wherein the wax-containing oil is mixed with solvent liquids other than naphtha or other fractions derived from petroleum, and which have relatively less solvent action upon the wax or solid hydrocarbons while retaining fairly complete solvent action upon or miscibility with the oil constituents or liquid hydrocarbons. These solvent liquids have included the aliphatic alcohols, ketones, etc., and various derivatives thereof such as various types of organic esters, acetates and the like.

However, when removing wax from mixtures of the wax-containing oil with solvents of the above type, and particularly in the case of heavier and relatively viscous oils, the resulting filter cake contains a very large amount of retained oil and solvent liquid. Even in the case of oils of around 50 to 70 Saybolt Universal seconds at 210° F., the resulting slack wax filter cake has comprised as much as 65% or more of oil and solvent liquid, and therefore necessitating the recrystallization of relatively large amounts of material in order to recover this retained oil and solvent liquid.

In the case of the heavier and relatively more viscous oils, there may be present certain heavy liquid hydrocarbon constituents which tend to impede filtration.

I have found that by first chilling the mixture of the wax-containing oil and organic solvent to a temperature at which the wax constituents are precipitated, and then mixing therewith a suitable quantity of filter-aid material, I am able to effectively separate the precipitated wax from the relatively viscous wax-containing oils. Moreover, I am able to obtain a much drier filter cake as well as greatly increase the rate of filtration over that ordinarily obtained even in the case of oils of relatively low viscosity.

My invention, therefore, comprises mixing with the wax-containing oil a selective solvent liquid characterized by its complete solvent action on the wax-containing oil at temperatures appreciably above 0° F. and its substantially non-solvent action upon the wax or solid hydrocarbons at relatively lower temperatures, chilling the mixture to a temperature at which the wax constituents are precipitated, then mixing finely divided filter-aid material, such as diatomaceous earth, with the solvent-oil and precipitated wax mixture while maintaining it in a chilled condition, and then filtering the resulting admixture while still in a cooled state.

Operating in this way the filtration rate may be increased from 30% to 50% or more over that obtained when filtering without a filter-aid material. At the same time, the dewaxing loss or yield of slack wax comprising solid wax constituents and retained liquid hydrocarbons may be reduced by approximately 50% as a result of producing a slack wax cake containing less oil, thereby effecting a substantial reduction in the volume of slack wax undergoing recrystallization and further treatment. The following example, which is presented by way of illustration, describes the dewaxing of a relatively viscous oil for the production of a lubricating oil of 0° F. pour test.

A lubricating distillate of 23.2° Bé. gravity and having a viscosity of 86 seconds at 210° F. Saybolt Universal is prepared by distilling reduced or topped mid-continent crude, preferably under a vacuum of around 28 to 30 inches of mercury. This distillate is advantageously subjected to chemical treatment comprising treating with strong mineral acid to remove impurities and then neutralizing the acid-treated oil either with an alkaline solution or contacting with a finely divided solid adsorbent material such as clay. Approximately 30 parts of this chemically-treated distillate is mixed with 70 parts of a solvent liquid comprising a mixture of 62% benzol and 38% acetone and chilled to a temperature of −20° F. to bring about precipitation of the wax constituents. To this chilled mixture of solvent-oil and precipitated wax is added filter-aid material in approximately the proportion of nine pounds of filter-aid material per barrel of mixture, the whole being subjected to stirring in order to bring about complete admixture of the filter-aid material and precipitated wax while maintaining the mass in a chilled condition.

The resulting admixture is then subjected to filtration at a temperature of around −10° F. under a pressure of around 40 pounds or higher in a leaf type of filter press to remove the precipitated wax and filter-aid material in the form of a filter cake.

A yield of 78% of dewaxed oil of 0° F. pour test may readily be obtained when operating in the foregoing manner. When dewaxing the same stock under substantially the same conditions but without using a filter-aid material, the yield of dewaxed oil of substantially the same pour test is only about 55 to 60 per cent of the original wax-containing oil. The ratio of liquid hydrocarbons to solid hydrocarbons of 137.5° F. melting point in the resulting slack wax or petrolatum is approximately 1.5 as compared with 1.0 when dewaxing in accordance with the method of my invention.

At the end of a filtering cycle, the resulting filter cake is either subjected to blowing with an inert gas to drive out the bulk of the retained liquid, or it may be first subjected to washing with fresh solvent to remove additional liquid hydrocarbons.

The washed filter cake may be heated, preferably in a closed system, melting the wax to recover the retained solvent liquid by vaporization and separating out the filter-aid material for use in dewaxing further oil.

While the dewaxing of a distillate oil has been described in the foregoing example, it is contemplated applying the process equally well to the dewaxing of various types of wax-containing oil including residual petroleum fractions, such as residual cylinder stocks.

Obviously many modifications and variations of the invention, as hereinbefore set forth, may be made without departing from the spirit and scope thereof, and therefore only such limitations should be imposed as are indicated in the appended claims.

I claim:

1. In dewaxing wax-bearing hydrocarbon oil by mixing the oil with a selective solvent liquid comprising a mixture of an aliphatic ketone with benzol or one of its homologues and such that when mixed in substantial proportions with each other and with the wax-bearing oil, the oil is substantially completely soluble in the solvent liquid mixture at temperatures of the order of −10 F. and the wax is substantially completely insoluble at such temperatures, chilling the mixture to precipitate the wax, and then filtering, the method of reducing oil loss due to soakage in the filter cake which comprises adding to the chilled mixture a dry, finely-divided, solid, inert, filter-aid material, and filtering the mixture in the presence of such filter-aid material whereby the yield of filtrate is substantially increased.

2. In dewaxing wax-bearing hydrocarbon oil by mixing the oil with a selective solvent having the essential solvent properties of a mixture composed of about one part acetone and chilling the mixture to precipitate the wax, and then filtering, the method of reducing oil loss due to soakage in the filter cake which comprises adding to the chilled mixture a filter-aid material of the diatomaceous earth type, and filtering the mixture in the presence of such filter-aid material whereby the yield of filtrate is substantially increased.

3. In dewaxing wax-bearing hydrocarbon oil by mixing the oil with a selective solvent having the essential solvent properties of a mixture composed of about one part acetone and about two parts of benzol as regards selective solvent action between liquid and solid hydrocarbons at temperatures of 0° F. or below, chilling the mixture to precipitate the wax, and then filtering, the method of reducing oil loss due to soakage in the filter cake which comprises adding to the chilled mixture from about ten to thirty pounds or more of a filter-aid material of the diatomaceous earth type per barrel of solvent-free oil, and filtering the mixture in the presence of such filter-aid material whereby the yield of filtrate is substantially increased.

MERTON L. LANGWORTHY.

CERTIFICATE OF CORRECTION.

Patent No. 1,956,036.  April 24, 1934.

MERTON L. LANGWORTHY.

It is hereby certified that error appears in the printed specification of the above numbered patent requiring correction as follows: Page 2, line 148, claim 2, after "acetone" insert the words about two parts of benzol as regards selective solvent action between liquid and solid hydrocarbons at temperatures of 0°F. or below; and that the said Letters Patent should be read with this correction therein that the same may conform to the record of the case in the Patent Office.

Signed and sealed this 19th day of June, A. D. 1934.

Bryan M. Battey (Seal)  Acting Commissioner of Patents.